United States Patent [19]
Little

[11] Patent Number: 5,145,436
[45] Date of Patent: Sep. 8, 1992

[54] FOLDABLE BEEHIVE FOUNDATION FRAME

[76] Inventor: Robert W. Little, Rte. 1, Box 76, New Harmony, Ind. 47631

[21] Appl. No.: 647,240

[22] Filed: Jan. 29, 1991

[51] Int. Cl.$^5$ .............................................. A01K 47/02
[52] U.S. Cl. ...................................................... 449/43
[58] Field of Search ....................... 449/35, 42, 43, 36

[56] References Cited

U.S. PATENT DOCUMENTS 4,374,440  2/1983  Drapkin ................................ 449/43

FOREIGN PATENT DOCUMENTS 2298945   8/1976  France ................................. 449/43
644507   10/1950  United Kingdom .................. 449/42

*Primary Examiner*—Robert P. Swiatek
*Attorney, Agent, or Firm*—Warren D. Flackbert

[57] ABSTRACT

A foldable beehive foundation frame presented in the form of a book, where hinges achieve the folding together of adjacent frameworks. The foundation is placed between the frameworks and, importantly, when such are closed, the foundation is secured and/or positioned along all four side edges under tension and/or pressure. Corresponding pins-recesses on the frameworks serve to prevent unwanted slipping between the closed frameworks. Spring wire type latches assure the maintenance of the foundation within the frame, where the foundation (sheet) remains straight and secure, and is prevented from warping and/or distortion, as when replacing the foundation, and, also, due to weather conditions. No tools, jigs or the like are required to replace foundation sheets.

2 Claims, 1 Drawing Sheet

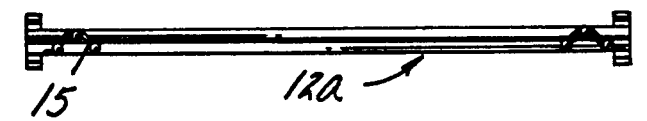
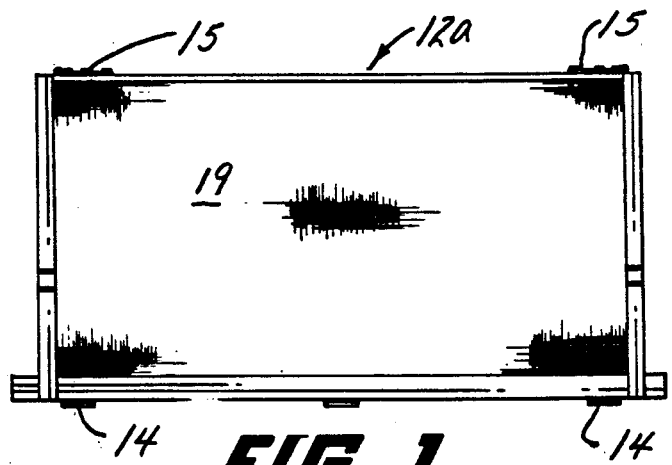
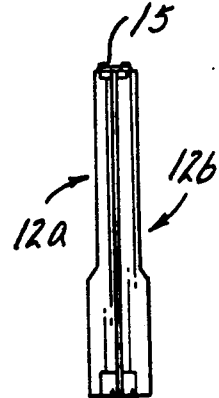
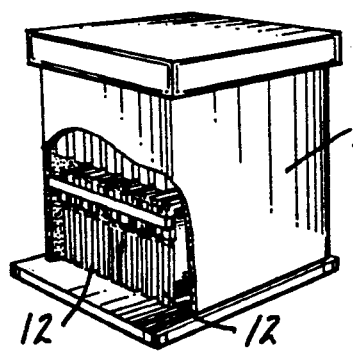
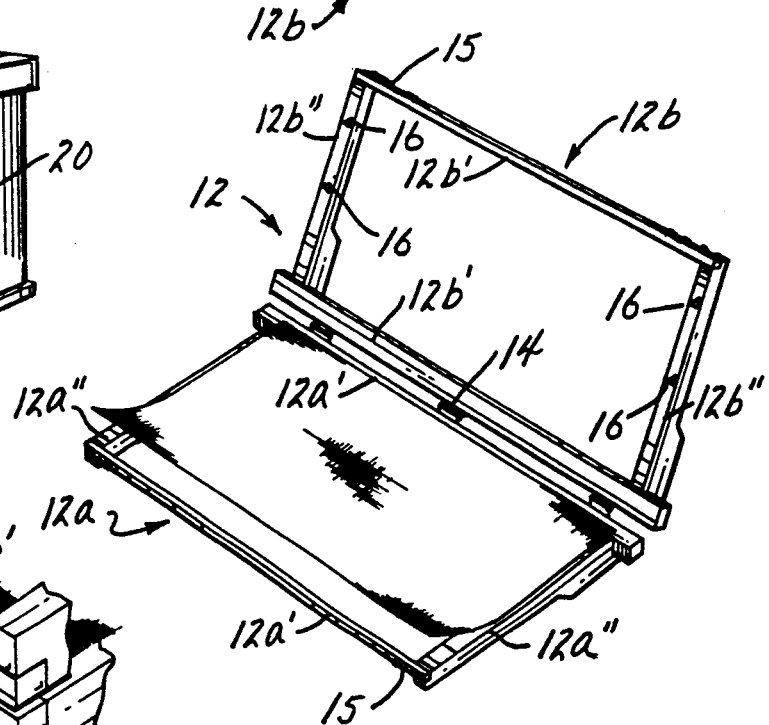
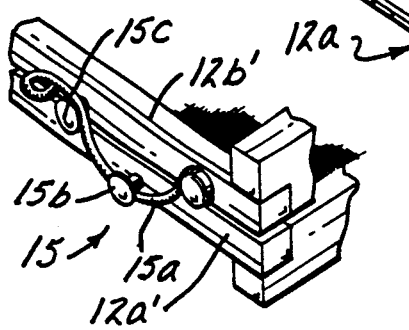

FOLDABLE BEEHIVE FOUNDATION FRAME

BACKGROUND OF THE INVENTION

As is known, the production of comb and bulk comb honey has a widespread following, where, for a matter of example, supermarkets are quite prone to promote and sell comb honey.

The preceding remains true, notwithstanding the fact specially built equipment is a necessity, as involving shallow frames for the foundation that is customarily used for the production of comb and bulk comb honey. As a matter of example, sized frames and frames with divided bottom bars and slotted top bars are used and, additionally, in order to produce a valuable workable foundation, ripple wire, with or without hooks, is available.

On the other hand, structure for achieving honey production can also be in the form of a pure beeswax foundation, but the significant problem in this connection remains as to placement without damage, including warping, distorting and the like.

BRIEF BACKGROUND OF THE INVENTION

The invention presents a foldable beehive foundation frame, in the form of a book, where, upon closing, the frame holding the foundation sheet is secured on all four sides, i.e. all edges, under tension and/or pressure. Pointed dowel pins are provided to assure positive closing without undesirable movement of the frameworks thereof.

The frame is arranged to accelerate handling, requiring no jigs or tools for the replacement of foundation sheets; may be fabricated from a wide selection of available material; and, serves considerable advantages over present frames which are designed to receive foundation sheets either by insertion and/or through a dropping procedure.

Thus, the operator has a high degree of control over honey production, utilizing a series of sheets which are consistent in operation, add to overall operational strength, and, as well, provides for a small amount of added honey over a standard frame.

DESCRIPTION OF THE FIGURES

A better understanding of the present invention will become more apparent from the following description, taken in conjunction with the accompanying drawing, wherein FIG. 1 is a view in front elevation showing a foundation sheet frame in accordance with the teachings of the present invention;

FIG. 2 is a top plan view, looking downwardly on FIG. 1, further detailing the invention;

FIG. 3 is a view in side elevation, looking from right to left on FIG. 1, still further detailing the invention;

FIG. 4 is a bottom plan view, looking from the bottom to the top of FIG. 1, again detailing the invention;

FIG. 5 is a perspective view of the instant beehive frame in an open position and with the foundation sheet in place for fastening;

FIG. 6 is a perspective view of a corner of an assembled beehive, illustrating a preferred frame fastening arrangement; and, FIG. 7 is another perspective view of a beehive, but partly broken away to illustrate placement of the individual foundation frames therewithin.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

DESCRIPTION OF THE PREFERRED EMBODIMENT

Referring now to the figures, a foldable beehive foundation frame 12 is disclosed, such being presented in the form of a book (see FIG. 5) having individual frameworks 12a, 12b thereof hinged, at 14, together. More specifically, each of the frameworks 12a, 12b includes generally parallel and elongated frame sections 12a', 12b' connected to each other by frame sections 12a'', 12b''. In other words, the partially opened foundation frame 12 of FIG. 5 closes into a frame presented by the end view of FIG. 3.

FIGS. 1, 2, 3 and 4 detail the instant foundation frame 12, i.e. from the side, the top, the bottom and an end, respectively, where such is commonly fabricated from No. 1 grade wood, such as pine, molded plastic resin or other non-toxic material.

As evident in FIG. 5, pairs of pointed (dowel) pins 16, extending from frame sections 12b'', through foundation 19 and into recesses in frame sections 12a'', serve to add frame 12 strength, as, for example, when the latter is placed within a centrifuge machine.

FIG. 6 discloses a fastening arrangement 15 involving a foldable wire 15a secured at one end to a frame section 12a' or 12b' and bendable about positioning button 15b (on the other corresponding frame section) and button 15c to achieve, as when in the configuration of FIG. 6, positive fastening. As evident in FIG. 2, two of such fastening arrangements are typically employed in the usage of the invention.

Merits of the instant foldable beehive foundation frame 12 lie in the positive securement of a foundation (sheet) 19, i.e., all edges are under tension and/or pressure when assembled for honey production. The arrangement is such that warping, distortion and the like are precluded and, also, handling is accelerated, no jigs or tools are required for the replacement of foundation sheets, and the latter may be readily received in the frames without the insertion and/or dropping procedure(s) customary in the past.

The ultimate usage of the invention is evident in FIG. 7, where the latter illustrates a beehive 20, partially opened to show the frames 12 in a side-by-side relationship. The assembly is such as to overcome any need for foundation sheet replacement due to heat, cold or like weather change and, as well, serves to expedite handling of the frame because of the hinge-spring latches employed.

The foldable beehive foundation frame described hereabove is susceptible to various changes within the spirit of the present invention, including, by way of example, proportioning; fastener placement; frame section assembly; and, the like. Thus, the preceding should be considered illustrative and not as limiting the scope of the following claims:

I claim:

1. A beehive foundation frame comprising a first framework and a second framework hinged together along one side, and foldable spring wire latch member selectively fastening together other of the sides, where each of said frameworks is defined by frame sections, each presenting a surface bearing against an edge of said foundation, where foundation securement is achieved through tension-pressure exerted upon closing said frameworks against edges of said foundation at an operative position, and where pins on the inner surfaces of frame sections project into corresponding openings in the inner surfaces of opposing frame sections and through said foundation.

2. The beehive foundation frame of claim 1 where said first framework and said second framework cooperate as a book closing against edges of said foundation disposed therebetween.

* * * * *